United States Patent [19]

Sittmann

[11] 3,905,611

[45] Sept. 16, 1975

[54] SUPPORT MECHANISM FOR SAFETY SKI BINDINGS

[75] Inventor: Brigitte Sittmann, Stuttgart, Germany

[73] Assignee: Vereinigte Baubeschlagfabriken Gretsch and Co. GmbH, Germany

[22] Filed: Dec. 27, 1972

[21] Appl. No.: 318,872

[30] Foreign Application Priority Data

Dec. 29, 1971 Germany............................ 2165314

[52] U.S. Cl..................... 280/11.35 T; 280/11.35 T
[51] Int. Cl.............................................. A63c 9/08
[58] Field of Search......... 280/11.35 T; 267/168, 89

[56] References Cited
UNITED STATES PATENTS

| | | | |
|---|---|---|---|
| 3,550,996 | 12/1970 | Marker.......................... | 280/11.35 T |
| 3,614,118 | 10/1971 | Salomon....................... | 280/11.35 T |

*Primary Examiner*—Robert R. Song
*Attorney, Agent, or Firm*—Craig & Antonelli

[57] ABSTRACT

A support mechanism for safety ski bindings which is under the effect of a retaining spring system and which is equipped with an adjusting device for adjusting the spring tension, in which at least two retaining springs are provided that are connected in parallel whereby only one of these springs is adjustable in its tension.

44 Claims, 3 Drawing Figures

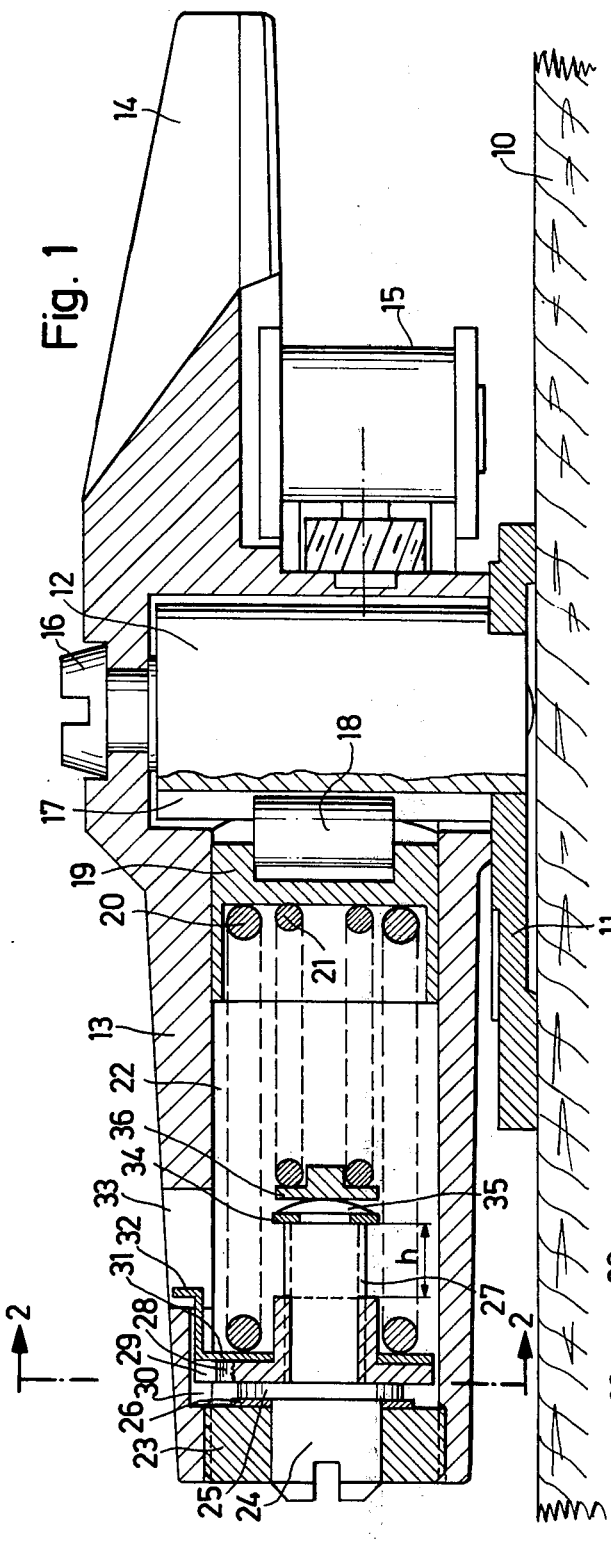
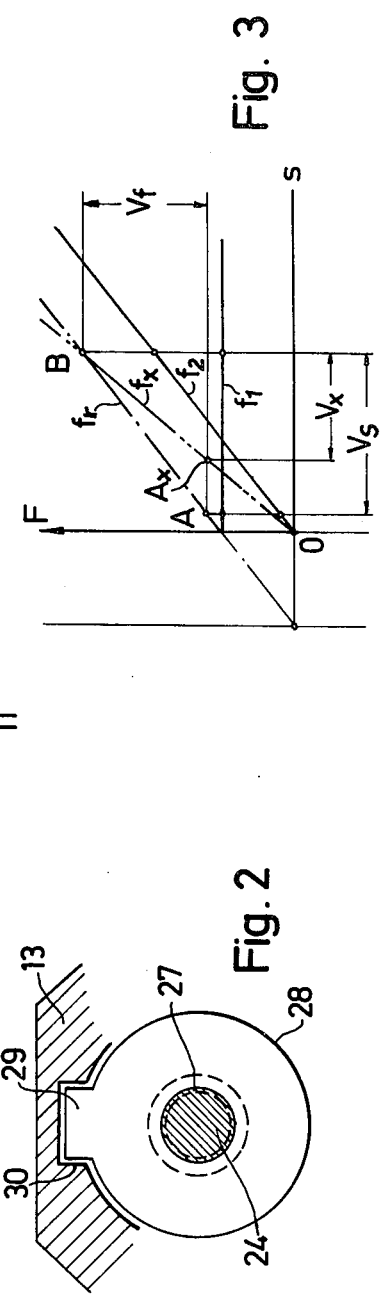

SUPPORT MECHANISM FOR SAFETY SKI BINDINGS

The present invention relates to a support mechanism which is under the influence of a retaining spring system, for safety ski bindings with a device for the control and adjustment of the spring stress or spring tension.

With the heretofore customary arrangements of this type, one end of the retaining spring was supported as a rule at a spring abutment adjustable in the axial direction of the spring. Consequently, the adjustment had to take place against the force of the entire retaining spring. However, this requires, in order to obtain the stroke necessary or desirable for the adjusting range, a relatively large spring with corresponding large wire thickness and large length and therewith also corresponding larger structural dimensions of the support mechanism.

The present invention is concerned with the task to avoid these disadvantages of the prior art adjustable retaining spring systems and to obtain with a relatively large adjusting stroke, a spring characteristic which corresponds to a spring with the greater spring length and possibly greater wire thickness.

Accordingly, the present invention essentially consists in that at least two parallelly connected retaining springs are provided and only one or essentially only one spring thereof is adjustable in its tension readable at a marking or a scale.

Only the first-mentioned spring has to be adjustable thereby from the outside, especially for the adjustment by the skier, whereas the other spring, which is under constant or essentially constant prestress, is arranged inaccessible from the outside.

The present invention offers the possibility to obtain with a relatively weak adjustable spring the same characteristics which are attainable otherwise with a single large spring in that the constant or approximately constant spring force of the other spring is superimposed on the spring force of the adjustable spring and a resulting spring force is produced thereby which lies above that of each of the two springs.

The two springs may, as such, have identical or different spring stiffnesses. With different spring stiffnesses, it may be advantageous to adjust that one of the two springs having the lesser or also that one having the larger spring stiffness.

In order to keep the dimensions of the support mechanism as small as possible, it is advantageous as a rule to arrange the springs, especially coil springs, concentrically or essentially concentrically to one another. Preferably only the outer one of the two springs is thereby adjustable by the skier in normal use of the binding.

Advantageously, the inner spring is supported on a threaded member which is rotatably but non-displaceably supported in the support part of the binding serving for the heel support, for example, in a housing fixed on the ski or pivotal relative thereto, and threadably carries on its thread a spring abutment for the outer spring which is non-rotatably but displaceably arranged in the support part.

The present invention is suited both for front jaws, especially those which are pivotally supported about a vertical axis against a detent effect, as also for heel support devices, especially those whose hold-down member is constructed housing-shaped and is supported to be pivoted up about a horizontal cross axis against the detent effect of a retaining spring.

Accordingly, it is an object of the present invention to provide a support mechanism for safety ski bindings which avoids by simple means the aforementioned shortcomings and drawbacks encountered in the prior art.

Another object of the present invention resides in a support mechanism for safety ski bindings which permits the attainment of desired spring characteristics yet facilitates the adjustment by the skier.

A further object of the present invention resides in a support mechanism for safety ski bindings in which the adjustment does not have to be made against the force of the entire retaining spring.

Still another object of the present invention resides in a support mechanism for safety ski bindings which eliminates the need for relatively large springs with corresponding large wire thicknesses.

Another object of the present invention resides in a support mechanism for safety ski bindings which permits smaller structural dimensions without any significant change in the adjustability of and in the spring characteristics thereof.

These and other objects, features and advantages of the present invention will become more apparent from the following description when taken in connection with the accompanying drawing which shows, for purposes of illustration only, one embodiment in accordance with the present invention, and wherein:

FIG. 1 is a longitudinal cross-sectional view through a front jaw of a safety binding provided with a retaining spring system according to the present invention;

FIG. 2 is a partial cross-sectional view taken along line 2—2 of FIG. 1; and

FIG. 3 is a spring diagram for a retaining spring system according to the present invention.

Referring now to the drawing wherein like reference numerals are used throughout the various views to designate like parts, the pivot bolt 12 with an axis extending perpendicularly to the ski surface is arranged on the ski 10, flangedly fixedly connected with the ski by way of the base plate 11. The front jaw 13 is rotatably supported about the axis of the pivot bolt 12; the two lateral support arms 14 of the front jaw overlap in a known manner the front part of the boot sole. A centrally arranged roller pair 15, for example, adjustable in the longitudinal direction of the ski, may serve for the additional support of the ski boot. Furthermore, the front jaw 13 may be adjustable in its height on the pivot bolt 12, for example, by means of a screw 16 axially extending through the pivot bolt 12.

The pivot bolt 12 is provided with a groove 17 V-shaped in cross section, into which engages in a known manner a detent member 18, for example, a roller or ball, which is guided by a slide member 19, for example, by a piston-like slide member 19. The slide member 19 serves as spring abutment for the two springs 20 and 21 which are accommodated in the cylindrical hollow space 22 of the front jaw 13 and which are supported with the ends opposite the slide member 19 in the manner to be described more fully hereinafter at the front jaw 13 by way of the closure member 23 closing off the hollow space 22 against the outside. The adjusting screw 24 is rotatably supported in the closure member 23 rigidly connected with the front jaw 13, for example, threaded into the same and secured against rotation. The adjusting screw 24 is secured against axial displacement by a collar 25 which is supported, for example, under interposition of a washer 26 against the closure member 23.

A spring plate 28 is adjustably arranged on the thread 27 of the adjusting screw 24 by screw action. The spring plate 28 serves for the support of the outer spring 20 and includes an extension 29 which engages in a longitudinal groove 30 of the front jaw 13 and is thereby secured against rotation with respect to the front jaw 13. The support of the outer spring 20 at the spring plate 28 takes place under interposition of an indicating disk 31 which is equipped with a pointer 32. The pointer 32 projects into an aperture 33 on the top side of the front jaw 13 so that it is visible from the outside, and cooperates with a scale or the like mounted on the top side of the front jaw.

A disk 34 is riveted onto the end of the adjusting screw 24 projecting into the hollow space 22, which serves as abutment for the stroke limitation of the spring plate 28 adapted to be screwed on the thread 27 so that the spring plate 28 can carry out altogether a stroke or travel $h$ for the adjustment of the spring stress of the outer spring 20. Furthermore, a spring plate 36 is supported at the rounded-off end 35 of the adjusting screw 24 which, in its turn, serves for the support of the inner spring 21.

The spring diagram of a retaining spring system according to the present invention is illustrated in FIG. 3. In this diagram, the spring force F is plotted against the adjusting range $s$.

It is assumed that the inner, (normally) not-adjustable spring 21 is under a prestress $f_1$, whereby the spring stiffness can remain without consideration whereas the adjustable outer spring 20 has a spring characteristic $f_2$. A resulting spring characteristic $f_r$ results therefrom which starts from a point outside the zero point 0 of the spring characteristic $f_2$ and rises, for example, toward a point B. Additionally, an adjusting range with the adjusting stroke $V_s$ and a spring change $V_f$ of the retaining spring system is desired which would correspond on the resulting spring characteristic curve $f_r$ to a range from point A to point B. Such a single resulting spring would require a relatively great length and wire thickness.

One could obtain also the same adjusting range $V_f$ of the spring tension by a spring with the characteristic $f_x$, whose adjusting range would extend from point $A_x$ to point B, whereby the point $A_x$ corresponds to the point A as regards the spring tension. The adjusting range $V_s$, however, would be reduced to the range $V_x$ which would be disadvantageous as regards a good reproducability and readability of the scale values. Also, a spring with the characteristic curve $f_x$ would be larger in its dimensions than the spring 20 with the spring characteristic curve $f_2$.

The adjustable spring 20 with the spring characteristic $f_2$ thus offers the same advantage as regards its adjusting range as a resulting spring with the spring characteristic $f_r$, but can be constructed considerably weaker than this spring. Compared to the spring with the characteristic $f_x$, it offers in contrast, above all, the advantage of a larger adjusting range $V_s$. Additionally, it can be kept also weaker than the spring with the characteristic $f_x$.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A support mechanism for safety ski bindings comprising:
    retaining spring means for applying ski boot retaining forces, said retaining spring means including two separate springs which cooperate to apply said retaining forces,
    and spring adjusting means for adjusting the spring tension of said retaining spring means, said spring adjusting means including means for varying the tension of one of said springs without varying the tension of the other of said springs,
    wherein said springs are arranged essentially concentrically with respect to one another.

2. A support mechanism according to claim 1, characterized in that an indicating means is provided for accommodating reading of the tension of the spring adjusted by said adjusting means.

3. A support mechanism according to claim 1, characterized in that only said one spring is adjustable whereas the other spring is under essentially constant prestress and is arranged inaccessibly from the outside of a housing for said springs.

4. A support mechanism according to claim 3, characterized in that said one spring is adjustable by the skier from the outside for purposes of adjusting the safety binding.

5. A support mechanism according to claim 3, characterized in that the springs are arranged essentially concentrically to one another.

6. A support mechanism according to claim 3, characterized in that the springs are coil springs.

7. A support mechanism according to claim 6, characterized in that the inner spring is supported on an adjusting screw means which is rotatably but non-displaceably supported in a spring support member of the ski binding, and characterized in that a spring abutment for the outer spring is threadedly supported on said adjusting screw means such that turning of said adjusting screw means effects movement of said spring abutment and consequent changes in the tension in said outer spring.

8. A support mechanism according to claim 7, characterized in that the spring support member is a part of a housing fixed on the ski.

9. A support mechanism according to claim 7, characterized in that the spring support member is part of a pivotal housing.

10. A support mechanism according to claim 7, characterized in that the spring abutment for the outer spring includes at its outer circumference at least one extension which is guided within longitudinal groove means.

11. A support mechanism according to claim 10, characterized in that the longitudinal groove means are provided in a part connected with the spring support member.

12. A support mechanism according to claim 10, characterized in that the stroke of the spring abutment for the outer spring is limited on the adjusting screw means by abutments provided at the adjusting screw means.

13. A support mechanism according to claim 12, characterized in that the last-mentioned abutments are constituted, on the one hand, by a collar of the adjusting screw means and, on the other, by a disk inserted into an annular groove thereof.

14. A support mechanism according to claim 13, characterized in that the disk is a springy disk.

15. A support mechanism according to claim 13, characterized in that the inner spring is supported on the adjusting screw means by an inner spring abutment rotatably supported on the adjusting screw means.

16. A support mechanism according to claim 15, characterized in that an indicating means is provided for accommodating reading of the tension of the spring adjusted by said adjusting means, characterized in that said one spring is adjustable by the skier from the outside for purposes of adjusting the safety binding, and characterized in that only the part of the adjusting means constituted by the spring abutment for the spring which is adjustable in its tension by the skier, is operatively associated with the indicating means.

17. A support mechanism according to claim 16, characterized in that the indicating means is a scale.

18. A support mechanism according to claim 16, characterized in that the indicating means is a marking.

19. A support mechanism according to claim 16, characterized in that the springs are supported at the ends thereof opposite the adjusting end of the adjustable spring at a detent means serving for the retaining of the ski boot.

20. A support mechanism according to claim 19, characterized in that the detent means includes a detent member and an intermediate member arranged between the detent member and the springs.

21. A support mechanism according to claim 19, characterized in that the springs are accommodated on the inside of a housing forming the support member of a front jaw means which is pivotal about a vertical axis against a detent effect.

22. A support mechanism according to claim 19, characterized in that the retaining springs are accommodated on the inside of a housing of a heel support mechanism which is adapted to be pivoted up about a supportantially horizontal cross axis.

23. A support mechanism according to claim 19, characterized in that the springs are coil springs.

24. A support mechanism according to claim 3, characterized in that only the outer spring of the essentially concentrically arranged springs is adjustable by the skier.

25. A support mechanism according to claim 1, characterized in that only the outer spring of the essentially concentrically arranged springs is adjustable by the skier.

26. A support mechanism according to claim 1, characterized in that the inner spring is supported on an adjusting screw means which is rotatably but non-displaceably supported in a spring support member of the ski binding, and characterized in that a spring abutment for the outer spring is threadedly supported on said adjusting screw means such that turning of said adjusting screw means effects movement of said spring abutment and consequent changes in the tension in said outer spring.

27. A support mechanism according to claim 26, characterized in that the spring abutment for the outer spring includes at its outer circumference at least one extension which is guided within longitudinal groove means.

28. A support mechanism according to claim 26, characterized in that the stroke of the spring abutment for the outer spring is limited on the adjusting screw means by abutments provided at the adjusting screw means.

29. A support mechanism according to claim 28, characterized in that the last-mentioned abutments are constituted, on the one hand, by a collar of the adjusting screw means and, on the other, by a disk inserted into an annular groove thereof.

30. A support mechanism according to claim 26, characterized in that the inner spring is supported on the adjusting screw means by an inner spring abutment rotatably supported on the adjusting screw means.

31. A support mechanism according to claim 1, characterized in that an indicating means is provided for accommodating reading of the tension of the spring adjusted by said adjusting means, characterized in that said one spring is adjustable by the skier from the outside for purposes of adjusting the safety binding, and characterized in that only the part of the adjusting means constituted by the spring abutment for the spring which is adjustable in its tension by the skier, is operatively associated with the indicating means.

32. A support mechanism according to claim 1, characterized in that the springs are accommodated on the inside of a housing forming the support member of a front jaw means which is pivotal about a vertical axis against a dent effect.

33. A support mechanism according to claim 1, characterized in that the retaining springs are accommodated on the inside of a housing of a heel support mechanism which is adapted to be pivoted up about a supportantially horizontal cross axis.

34. A support mechanism comprising:
retaining spring means for applying retaining forces, said retaining spring means including two separate springs which cooperate to apply said retaining forces,
and spring adjusting means for adjusting the spring tension of said retaining spring means, said spring adjusting means including means for varying the tension of one of said springs without varying the tension of the other of said springs,
characterized in that the springs are arranged essentially concentrically to one another.

35. A support mechanism according to claim 34, characterized in that the tension of the adjustable spring is readable at an indicating means.

36. A support mechanism according to claim 34, characterized in that only said one spring is adjustable whereas the other spring is under essentially constant prestress and is arranged inaccessibly from the outside.

37. A support mechanism according to claim 34, characterized in that the springs are coil springs.

38. A support mechanism for safety ski bindings comprising:
a movable locking member,
retaining means for applying ski boot retaining forces to said movable locking member, said retaining means including two separate resilient means which cooperate to apply said retaining forces, and adjusting means for adjusting the resilient tension of said retaining means, said adjusting means including means for varying the tension of one of said resilient means without varying the tension of the other of said resilient means, wherein both of said resilient means have one end thereof supported at said movable locking member.

39. A support mechanism according to claim 38, wherein said springs are arranged essentially concentrically with respect to one another.

40. A support mechanism according to claim 38, characterized in that an indicating means is provided for accommodating reading of the tension of the spring adjusted by said adjusting means, characterized in that said one spring is adjustable by the skier from the outside for purposes of adjusting the safety binding, and characterized in that only the part of the adjusting means constituted by the spring abutment for the spring which is adjustable in its tension by the skier, is operatively associated with the indicating means.

41. A support mechanism according to claim 38, characterized in that the springs are accommodated on the inside of a housing forming the support member of a front jaw means which is pivotal about a vertical axis against a detent effect.

42. A support mechanism according to claim 38, characterized in that the retaining springs are accommodated on the inside of a housing of a heel support mechanism which is adapted to be pivoted up about a supportantially horizontal cross axis.

43. A support mechanism according to claim 38, wherein each of said resilient means are spring means.

44. A support mechanism according to claim 1, wherein said springs extend parallel to one another.

* * * * *